United States Patent
Ma et al.

(10) Patent No.: US 9,419,542 B2
(45) Date of Patent: Aug. 16, 2016

(54) INVERTER DEVICE

(71) Applicant: Murata Manufacturing Co., Ltd., Nagaokakyo-shi, Kyoto-fu (JP)

(72) Inventors: Yue Ma, Nagaokakyo (JP); Hitoshi Tsuji, Nagaokakyo (JP); Koichi Ueki, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 14/680,272

(22) Filed: Apr. 7, 2015

(65) Prior Publication Data

US 2015/0311822 A1 Oct. 29, 2015

Related U.S. Application Data

(63) Continuation of application No. PCT/JP2013/077432, filed on Oct. 9, 2013.

(30) Foreign Application Priority Data

Oct. 17, 2012 (JP) .................................. 2012-230017

(51) Int. Cl.
*H02M 7/5387* (2007.01)
*H02M 7/483* (2007.01)
*H02M 7/487* (2007.01)
*H02M 1/00* (2006.01)

(52) U.S. Cl.
CPC .......... *H02M 7/53871* (2013.01); *H02M 7/483* (2013.01); *H02M 7/487* (2013.01); *H02M 2001/007* (2013.01)

(58) Field of Classification Search
CPC ................................................. H02M 7/53871
See application file for complete search history.

(56) References Cited

U.S. PATENT DOCUMENTS

| | | | |
|---|---|---|---|
| 2006/0062034 A1 | 3/2006 | Mazumder et al. | |
| 2011/0012543 A1 | 1/2011 | Takizawa et al. | |
| 2011/0211381 A1 | 9/2011 | Iwata et al. | |
| 2011/0299312 A1* | 12/2011 | Karraker | H02J 3/383 363/132 |
| 2012/0044730 A1* | 2/2012 | Paakkinen | H02M 7/487 363/131 |

(Continued)

FOREIGN PATENT DOCUMENTS

| | | |
|---|---|---|
| JP | 2006-223009 A | 8/2006 |
| JP | 2011-024369 A | 2/2011 |

(Continued)

OTHER PUBLICATIONS

Official Communication issued in International Patent Application No. PCT/JP2013/077432, mailed on Dec. 24, 2013.

*Primary Examiner* — Emily P Pham
(74) *Attorney, Agent, or Firm* — Keating & Bennett, LLP

(57) ABSTRACT

A three-level inverter circuit includes first to fourth front-stage switches connected in series, and a floating capacitor connected between a connection point of the first and second front-stage switches and a connection point of the third and fourth front-stage switch elements, and outputs an intermediate voltage of a DC power supply through a connection point of the second and third front-stage switches. A bridge circuit includes first, second, third, and fourth rear-stage switches which are bridge-connected to first to fourth terminals. The first terminal thereof is connected to a connection point of the second front-stage switch and the third front-stage switch and a second terminal thereof is connected to the second input terminal.

11 Claims, 14 Drawing Sheets

(56) References Cited

U.S. PATENT DOCUMENTS

2012/0218795 A1  8/2012  Mihalache
2013/0155747 A1* 6/2013  Wang .................... H02M 7/487
                                                    363/132

FOREIGN PATENT DOCUMENTS

| JP | 2011-217575 A | 10/2011 |
| WO | 2010/058536 A1 | 5/2010 |

* cited by examiner

| STATE | H | Mc | Md | L |
|---|---|---|---|---|
| Vo | Vdc | Vdc/2 | Vdc/2 | 0 |
| S1 | ON | ON | OFF | OFF |
| S2 | ON | OFF | ON | OFF |
| S3 | OFF | ON | OFF | ON |
| S4 | OFF | OFF | ON | ON |

FIG. 5

|  | S1 | S2 | S3 | S4 | S1U S2W | S2U S1W | Vu (INSTANTANEOUS VOLTAGE DIFFERENCE BETWEEN TERMINALS U AND W) |
|---|---|---|---|---|---|---|---|
| CP1(H) | ON | ON | OFF | OFF | ON | OFF | Vdc |
| CP2(Mc) | ON | OFF | ON | OFF | ON | OFF | Vdc/2 |
| CP3(Md) | OFF | ON | OFF | ON | ON | OFF | Vdc/2 |
| CP4(L) | OFF | OFF | ON | ON | ON | OFF | 0 |
| CP5(L) | OFF | OFF | ON | ON | OFF | ON | 0 |
| CP6(Md) | OFF | ON | OFF | ON | OFF | ON | −Vdc/2 |
| CP7(Mc) | ON | OFF | ON | OFF | OFF | ON | −Vdc/2 |
| CP8(H) | ON | ON | OFF | OFF | OFF | ON | −Vdc |

| TIME SECTION | Vu* (TARGET VALUE OF Vu) SECTION | SWITCHING PATTERN |
|---|---|---|
| I , III | [0~+Vdc/2] | CP4 ⇄ (CP2⇄CP3) |
| II | [+Vdc/2~+Vdc] | (CP2⇄CP3) ⇄ CP1 |
| IV , VI | [0~-Vdc/2] | CP5 ⇄ (CP6⇄CP7) |
| V | [-Vdc/2~-Vdc] | (CP6⇄CP7) ⇄ CP8 |

| Q12 | Q11 | S1  | S2  | S3  | S4  |
|-----|-----|-----|-----|-----|-----|
| L   | L   | OFF | OFF | ON  | ON  |
| L   | H   | ON  | OFF | ON  | OFF |
| H   | L   | OFF | ON  | OFF | ON  |
| H   | H   | ON  | ON  | OFF | OFF |

FIG. 16

|  | S1 | S2 | S3 | S4 | S1U S2W | S2U S1W | Vu (INSTANTANEOUS VOLTAGE DIFFERENCE BETWEEN TERMINALS U AND W) |
|---|---|---|---|---|---|---|---|
| CP1(H) | ON | ON | OFF | OFF | ON | OFF | Vdc |
| CP2(M) | OFF | ON | ON | OFF | ON | OFF | Vdc/2 |
| CP3(L) | OFF | OFF | ON | ON | ON | OFF | 0 |
| CP4(L) | OFF | OFF | ON | ON | OFF | ON | 0 |
| CP5(M) | OFF | ON | ON | OFF | OFF | ON | −Vdc/2 |
| CP6(H) | ON | ON | OFF | OFF | OFF | ON | −Vdc |

INVERTER DEVICE

BACKGROUND OF THE INVENTION

1. Field of the Invention

The present invention relates to a direct-current/alternating current (DC/AC) inverter device, and in particular, relates to an inverter device including a multi-level circuit.

2. Description of the Related Art

In recent years, for example, a solar power generation system has been spread and a power system (hereinafter, referred to simply as "system") interconnection inverter of a non-insulating type is the mainstream in terms of enhancement of efficiency. For example, Japanese Unexamined Patent Application Publication No. 2006-223009 discloses an inverter device including a multi-level circuit that outputs equal to or more than three voltages in order to generate a sine wave voltage (to input a sine wave current into the system) in the non-insulating inverter.

FIG. 1 in Japanese Unexamined Patent Application Publication No. 2006-223009 discloses the configuration of a five-level inverter in which a series circuit of four capacitors and a series circuit of eight switches are provided between positive and negative electrode terminals of a direct-current power supply, and switches or diodes are connected between connection points of these capacitors and connection points of the switch elements.

A multi-level circuit needs 2(n−1) switches when a level number is assumed to be n. For example, in the case of the five-level inverter as described in Japanese Unexamined Patent Application Publication No. 2006-223009, eight switches in total are needed and each of the switches operates at a carrier frequency. Due to this, it is difficult to reduce switching loss in Japanese Unexamined Patent Application Publication No. 2006-223009.

SUMMARY OF THE INVENTION

Preferred embodiments of the present invention provide an inverter device that significantly reduces or prevents switching loss.

An inverter device according to an aspect of various preferred embodiments of the present invention that receives input of a direct-current (DC) voltage through a first input terminal and a second input terminal and outputs an alternating-current (AC) voltage through a first output terminal and a second output terminal, includes a three-level inverter circuit including first, second, third, and fourth front-stage switches which are connected in series between the first input terminal and the second input terminal, and an intermediate voltage output circuit in which a first terminal is connected to a connection point of the first front-stage switch and the second front-stage switch and a second terminal is connected to a connection point of the third front-stage switch and the fourth front-stage switch element, and which outputs an intermediate voltage of the direct-current (DC) voltage through a connection point of the second front-stage switch and the third front-stage switch element, a bridge circuit including first, second, third, and fourth rear-stage switches which are bridge-connected to first, second, third, and fourth terminals, the first terminal of which is connected to a connection point of the second front-stage switch and the third front-stage switch element, the second terminal of which is connected to the second input terminal, the third terminal of which is connected to the first output terminal, and the fourth terminal of which is connected to the second output terminal, and at least one inductor configured to provide smoothing.

With this configuration, each rear-stage switch in the bridge circuit is switching-controlled at a power supply frequency (e.g., about 50 Hz or about 60 Hz) of the system such that polarity of output from the three-level inverter circuit is inverted by the bridge circuit and an electric current with a sine waveform is output to a system connected. Accordingly, the inverter device PWM-controls the front-stage switches at a carrier frequency of about 20 kHz, for example, whereas the inverter device switching-controls the rear-stage switches at about 50 Hz or about 60 Hz. As a result, switching loss is significantly reduced or prevented.

Further, the three-level inverter circuit preferably is configured by the switch elements, the number of which is smaller than that of the multi-level circuit included in the existing inverter device. Therefore, the small-sized inverter device is able to be configured at low cost.

It is preferable that the first rear-stage switch and the fourth rear-stage switch be turned ON or OFF at the same time, the second rear-stage switch and the third rear-stage switch be turned ON or OFF at the same time, and a switching frequency of the first, second, third, and fourth rear-stage switches be a frequency of an AC power supply voltage that is generated between the first output terminal and the second output terminal, and a switching frequency of the first, second, third, and fourth front-stage switches be higher than the switching frequency of the first, second, third, and fourth rear-stage switches and be a frequency at which the smoothing action by the inductor is generated.

With this configuration, the inverter device that supplies electric power to the system is capable of being used.

It is preferable that the inverter device further includes a detector configured or programmed to detect an output current and an output voltage from the first output terminal and the second output terminal, an amplifier configured or programmed to amplify a current error as an error of the output current with respect to a sine wave current target value, a calculator configured or programmed to calculate a voltage correction value toward reducing the current error, a controller configured or programmed to superimpose the voltage correction value on a detected value of the output voltage so as to calculate a voltage target value, a PWM modulator configured or programmed to calculate a PWM modulation signal of the voltage target value, a switch driver configured or programmed to drive the first, second, third, and fourth front-stage switches based on the PWM modulation signal, and a switch configured or programmed to change a state of the bridge circuit based on a current sign.

With this configuration, a desired voltage with a sine waveform is generated.

It is preferable that the intermediate voltage output circuit include a floating capacitor including a first terminal connected to a connection point of the first front-stage switch and the second front-stage switch element, and a second terminal connected to a connection point of the third front-stage switch and the fourth front-stage switch element.

With this configuration, a DC voltage of single polarity input is able to generate a sine wave voltage.

It is preferable that the intermediate voltage output circuit include a first capacitor and a second capacitor which are connected in series between the first input terminal and the second input terminal, a first diode a cathode of which is connected to a connection point of the first front-stage switch and the second front-stage switch and an anode of which is connected to a connection point of the first capacitor and the second capacitor, and a second diode a cathode of which is connected to a connection point of the first capacitor and the second capacitor and an anode of which is connected to a connection point of the third front-stage switch and the fourth front-stage switch element.

With this configuration, a DC voltage of single polarity input can generate a sine wave voltage.

It is preferable that the inductor is provided at least one of between a connection point of the second front-stage switch and the third front-stage switch and the first terminal, and between a connection point of the fourth front-stage switch and the second input terminal and the second terminal.

With this configuration, an influence of voltage fluctuation by a switching operation is significantly reduced or prevented.

According to various preferred embodiments of the present invention, the rear-stage switches are switching-controlled at the power supply frequency (e.g., about 50 Hz or about 60 Hz) of the system, thus significantly reducing or preventing switching loss. Further, the small-sized inverter device constituted by the small number of switches is able to be configured at low cost.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 5 is a table illustrating relationships among states of the four front-stage switch elements, states of four rear-stage switch elements, and an instantaneous value of an output voltage.

FIG. 16 is a table illustrating relationships among states of the four front-stage switch elements, states of the four rear-stage switch elements, and an instantaneous value of the output voltage Vu.

DETAILED DESCRIPTION OF THE PREFERRED EMBODIMENTS

First Preferred Embodiment

Figures 1, 2:
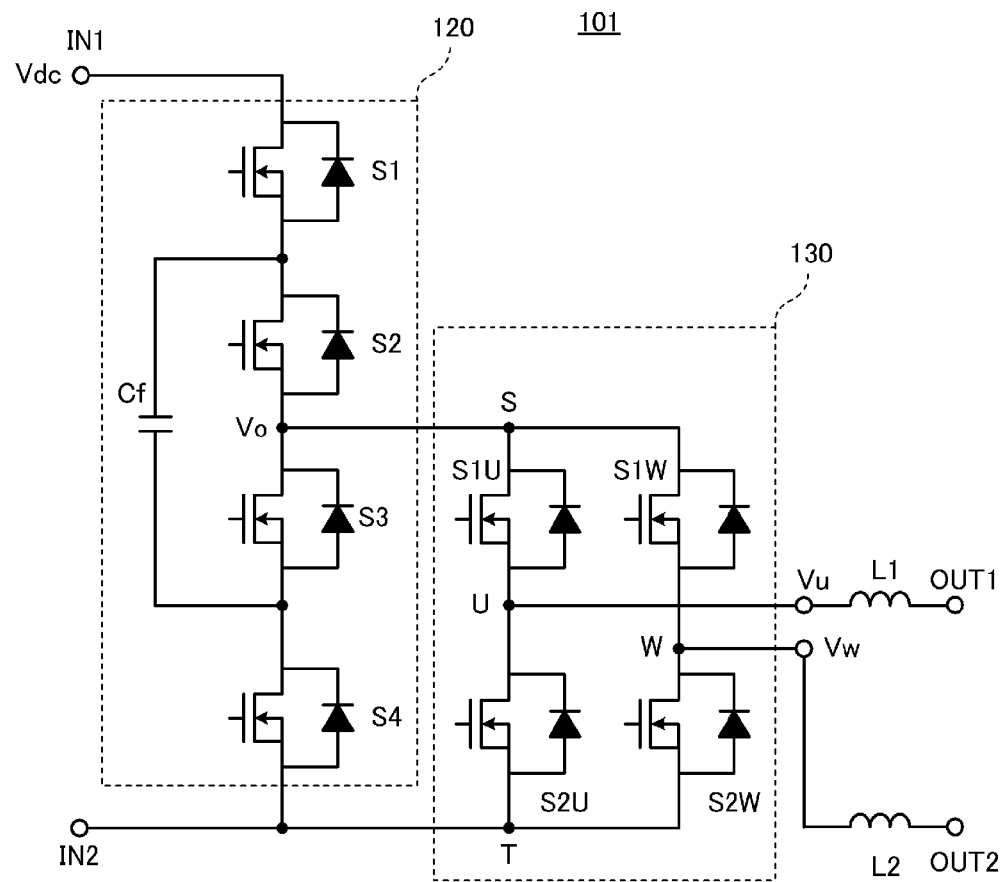
FIG. 1 is a circuit diagram of an inverter device according to a first preferred embodiment of the present invention.
FIG. 2 is a table illustrating relationships between four states of front-stage switches and an output voltage.

FIG. 1 is a circuit diagram of an inverter device according to a first preferred embodiment of the present invention.

An inverter device 101 in the first preferred embodiment includes a first input terminal IN1 and a second input terminal IN2 that are connected to a direct-current (DC) power supply and a first output terminal OUT1 and a second output terminal OUT2 configured to output an alternating-current (AC) voltage. A DC voltage Vdc that is generated by a solar power generation panel, for example, is applied to the first input terminal IN1 and the second input terminal IN2. An AC voltage of a single phase two-wire system is output through the first output terminal OUT1 and the second output terminal OUT2. When the output voltage is 202 Vrms, for example, the first output terminal OUT1 and the second output terminal OUT2 are connected to distribution lines of a single phase two-wire system and the voltage is output thereto. When the output voltage is 101 Vrms, for example, the first output terminal OUT1 and the second output terminal OUT2 are connected to a load in a self-support operation mode.

A three-level inverter circuit 120 is connected between the first input terminal IN1 and the second input terminal IN2. The three-level inverter circuit 120 outputs a potential in a range of a high (H)-side potential to a low (L)-side potential that are input. The first input terminal IN1 is at the high (H) side and the second input terminal IN2 is at the low (L) side, and Vdc is applied to the first input terminal IN1. The potential of the three-level inverter circuit 120 at the high (H) side is Vdc and the potential thereof at the low (L) side is 0, so that a potential of the output terminal (between S and T) of the three-level inverter circuit 120 is in a range of Vdc to 0.

The three-level inverter circuit 120 preferably includes a first front-stage switch S1, a second front-stage switch S2, a third front-stage switch S3, and a fourth front-stage switch S4 that are connected in series between the first input terminal IN1 and the second input terminal IN2. Further, the three-level inverter circuit 120 includes a floating capacitor (intermediate voltage output circuit) Cf. A first terminal of the floating capacitor Cf is connected to a connection point of the first front-stage switch S1 and the second front-stage switch S2 and a second terminal of the floating capacitor Cf is connected to a connection point of the third front-stage switch S3 and the fourth front-stage switch S4.

A bridge circuit 130 is connected between the three-level inverter circuit 120 and the first output terminal OUT1 and the second output terminal OUT2. The bridge circuit 130 switches the output of the three-level inverter circuit 120 to be in a first state where the output of the three-level inverter circuit 120 is connected to the first output terminal OUT1 through a first inductor L1 and a second state where it is connected to the second output terminal OUT2 through a second inductor L2. The first state corresponds to a first-half cycle of a power supply frequency of the system and the second state corresponds to a second-half cycle of the power supply frequency of the system. Any one of the first inductor L1 and the second inductor L2 may be omitted as long as an effect of a smoothing action is in an allowable range.

The bridge circuit 130 preferably includes a first terminal S, a second terminal T, a third terminal U, and a fourth terminal W. The first terminal S is connected to a connection point of the second front-stage switch S2 and the third front-stage switch S3. The second terminal T is connected to the second input terminal IN2. The third terminal U is connected to the first output terminal OUT1. The fourth terminal W is connected to the second output terminal OUT2.

A first rear-stage switch S1U, a second rear-stage switch S2U, a third rear-stage switch S1W, and a fourth rear-stage switch S2W are bridge-connected to the first terminal S, the second terminal T, the third terminal U, and the fourth terminal W. To be specific, the first rear-stage switch S1U is connected between the first terminal S and the third terminal U. The second rear-stage switch S2U is connected between the third terminal U and the second terminal T. The third rear-stage switch S1W is connected between the first terminal S and the fourth terminal W. The fourth rear-stage switch S2W is connected between the fourth terminal W and the second terminal T.

Each of the four front-stage switches S1 to S4 and the four rear-stage switches S1U, S2U, S1W, and S2W preferably are metal-oxide-semiconductor field-effect transistors (MOS-FET) and body diodes are also illustrated in FIG. 1. The front-stage switches S1 to S4 of the three-level inverter circuit 120 are connected in series, so that a low-withstand voltage switch preferably is used for each of the four switches S1 to S4. Therefore, the four front-stage switches S1 to S4 are preferably defined not by insulated gate bipolar transistors (IGBT) but by the MOS-FETs, thus reducing cost and enhancing efficiency.

The front-stage switches S3 and S4, the rear-stage switches S1U and S2U, and the rear-stage switches S1W and S2W that are connected in series are connected to a common potential line (signal line connected to the second input terminal IN2). With this, the respective switches preferably are switching-controlled by a driver IC that is driven by a common power supply so as to prevent the driver circuit configuration from being complicated. Further, the number of front-stage switches is able to be made smaller than that in the existing technique, thus reducing the number of high-side driver ICs and reducing cost.

Figure 3:
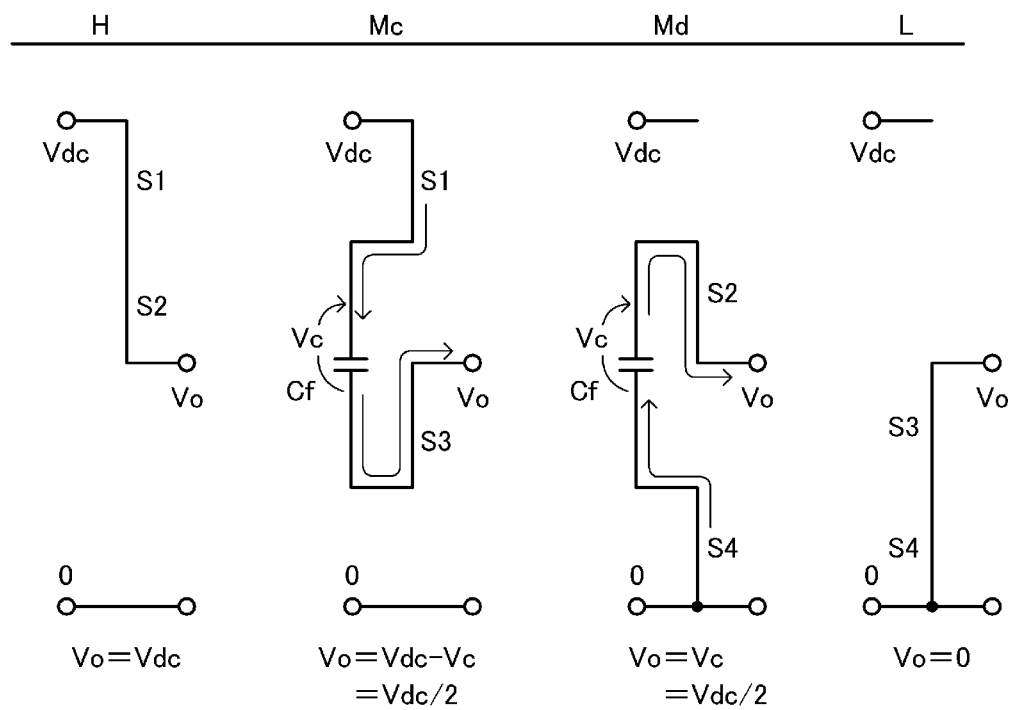
FIG. 3 is an equivalent circuit diagram of a three-level inverter circuit in each of the four states as illustrated in FIG. 2.

FIG. 2 is a table illustrating relationships between states of the four front-stage switches S1 to S4 and an output voltage (potential) Vo. The four front-stage switches S1 to S4 are in any of four states H, Mc, Md, and L. FIG. 3 is an equivalent circuit diagram of the three-level inverter circuit 120 in each of the four states as illustrated in FIG. 2.

In the state H where the front-stage switches S1 and S2 are ON and the front-stage switches S3 and S4 are OFF, the output voltage Vo is Vdc. In the state L where the front-stage switches S3 and S4 are ON and the front-stage switches S1 and S2 are OFF, the output voltage Vo is 0. In the state Mc where the front-stage switches S1 and S3 are ON and the front-stage switches S2 and S4 are OFF, the output voltage Vo is Vdc−Vc. Note that Vc is a charged voltage of the floating capacitor Cf. When it is assumed that Vc is Vdc/2, the output voltage Vo is Vdc/2. In the state Md where the front-stage switches S2 and S4 are ON and the front-stage switches S1 and S3 are OFF, the output voltage Vo is Vc. When it is assumed that Vc is Vdc/2, the output voltage Vo is Vdc/2.

It can be considered that a charged charge amount of the floating capacitor Cf and a discharged charge amount thereof are equal or substantially equal to each other. Therefore, the output voltage Vo in the state Mc and the output voltage Vo in the state Md are equal or substantially equal to each other. That is to say, the charged voltage Vc of the floating capacitor Cf is charged and discharged by Vdc/2 which is the half of the Vdc and is an average. When a charging and discharging time constant of the floating capacitor Cf is sufficiently large relative to a switching frequency, it is considered that a fluctuation range of the charged voltage Vc is small and Vc is nearly equal to Vdc/2.

Figure 4:
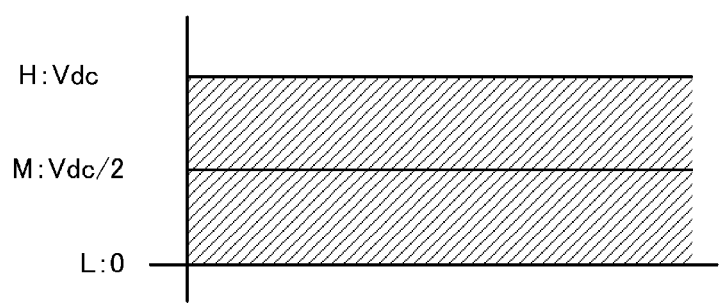
FIG. 4 is a diagram illustrating a range of a possible voltage based on an output voltage of the three-level inverter circuit.

FIG. 4 is a diagram illustrating a range of a possible voltage based on the output voltage of the three-level inverter circuit 120. As described above, a voltage in a range of Vdc to 0 can be output by selecting the four states H, Mc, Md, L with switching of the four front-stage switches S1 to S4. The bridge circuit 130 switches the above-mentioned first state and second state (inverts polarity) so as to configure a five-level circuit.

Figure 6:
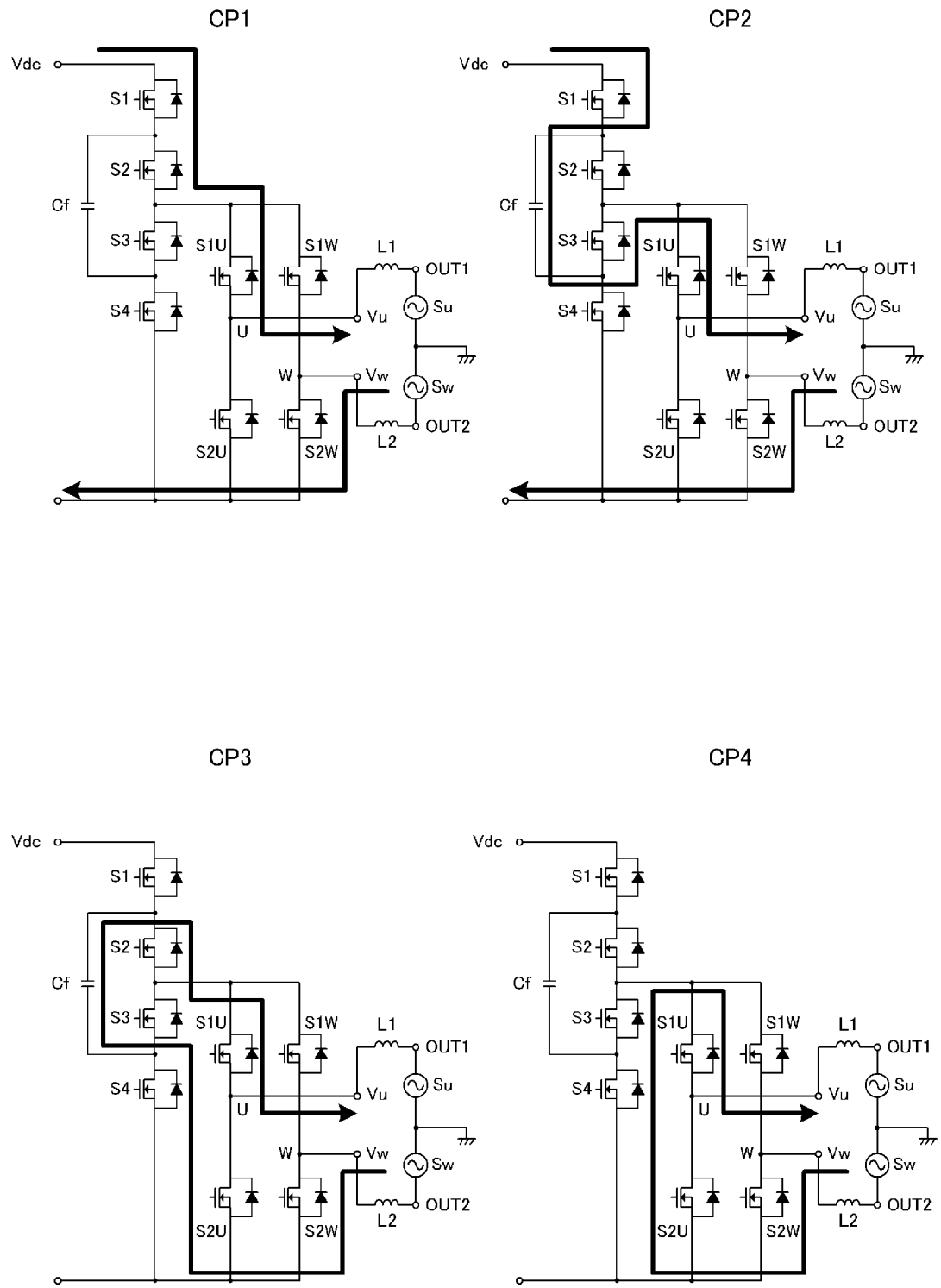
FIG. 6 are diagrams illustrating current paths in eight states CP1 to CP4 as illustrated in FIG. 5.
Figure 7:
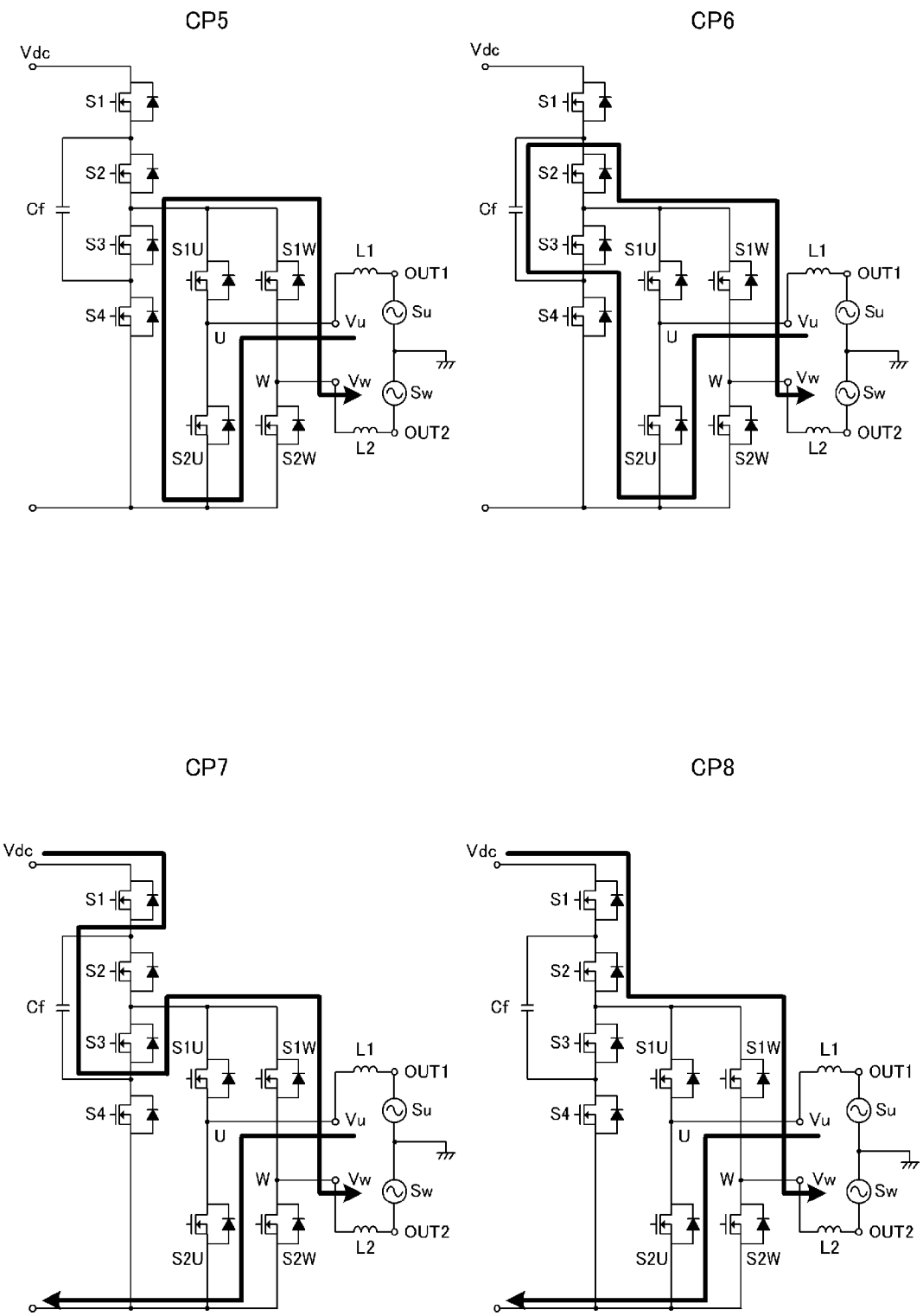
FIG. 7 are diagrams illustrating current paths in eight states CP5 to CP8 as illustrated in FIG. 5.

FIG. 5 is a table illustrating relationships among states of the four front-stage switches S1 to S4, the states of the four rear-stage switches S1U, S2U, S1W, and S2W, and an instantaneous value (instantaneous voltage difference between the terminals U and W) of the output voltage Vu of the terminals U−W. FIG. 6 and FIG. 7 are diagrams illustrating current paths in eight states CP1 to CP8 as illustrated in FIG. 5.

The states CP1 and CP8 correspond to the state H in FIG. 3 and FIG. 4, the states CP2 and CP7 correspond to the state Mc in FIG. 3 and FIG. 4, the states CP3 and CP6 correspond to the state Md in FIG. 3 and FIG. 4, and the states CP4 and CP5 correspond to the state L in FIG. 3 and FIG. 4.

The instantaneous value of the output voltage Vu is any one of five levels of Vdc, Vdc/2, 0, −Vdc/2, and −Vdc. The four front-stage switches S1 to S4 are PWM-controlled at a carrier frequency of 20 kHz, for example, such that the output from the three-level inverter circuit 120 defines a waveform of half the sine waves of the current that is flowed into the system. Further, the four rear-stage switches S1U, S2U, S1W, and S2W invert the polarity of the output from the three-level inverter circuit between the first-half cycle and the second-half cycle of the power supply frequency (50 Hz or 60 Hz) of the system. That is to say, the switching frequency of the four front-stage switches S1 to S4 is higher than the switching frequency of the four rear-stage switches S1U, S2U, S1W, and S2W. The switching frequency of the four front-stage switches S1 to S4 is a frequency at which the smoothing action is generated by the first inductor L1 and the second inductor L2. As a result, a current with a sine waveform is flowed into the system.

Thus, the four rear-stage switches S1U, S2U, S1W, and S2W are switching-controlled not at the carrier frequency but at the power supply frequency of the system, thereby reducing the switching loss. Further, the five-level output is realized by the configuration including the three-level inverter circuit 120 and the bridge circuit 130. This reduces the number of switch elements, the size, and the cost.

Figures 8, 9:
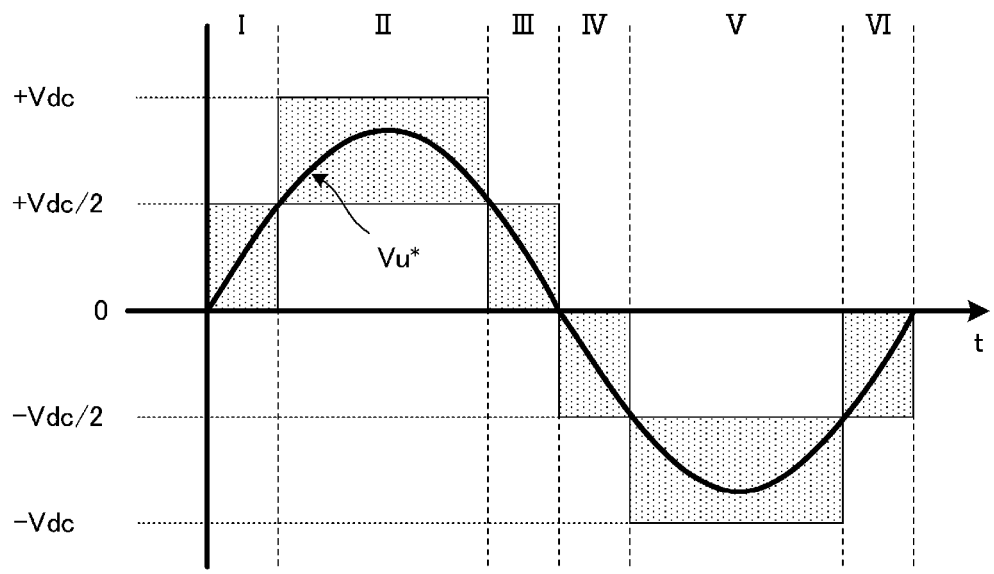
FIG. 8 is a graph illustrating a relationship between five-level voltages and a target value Vu* of an output voltage Vu.
FIG. 9 is a table illustrating a relationship among a time section, a voltage section, and a switching pattern in FIG. 8.

FIG. 8 is a graph illustrating a relationship between the five-level voltages and a target value Vu* of the output voltage Vu. FIG. 9 is a table illustrating a relationship among a time section, a voltage section, and a switching pattern in FIG. 8. Ranges filled with gray in FIG. 8 indicate possible ranges of the voltage.

As seen from these drawings, when the target value Vu* of the output voltage Vu is in a range of 0 to Vdc/2 (time sections of I and III), state shift of the state CP4→CP2→CP4→CP3→CP4→CP2→ . . . among the four states as illustrated in FIG. 6 is repeated as a result by the PWM control. When the target value Vu* of the output voltage Vu is in a range of Vdc/2 to Vdc (time section of II), state shift of the state CP2→CP1→CP3→CP1→CP2→CP1→ . . . among the four states as illustrated in FIG. 6 is repeated as a result by the PWM control.

When the target value Vu* of the output voltage Vu is in a range of 0 to −Vdc/2 (time sections of IV and VI), state shift of the state CP5→CP6→CP5→CP7→CP5→CP6→ . . . among the four states as illustrated in FIG. 7 is repeated as a result by the PWM control. When the target value Vu* of the output voltage Vu is in a range of −Vdc/2 to −Vdc (time section of V), state shift of the state CP6→CP8→CP7→CP8→CP6→CP8→ . . . among the four states as illustrated in FIG. 7 is repeated as a result by the PWM control.

Figure 10:
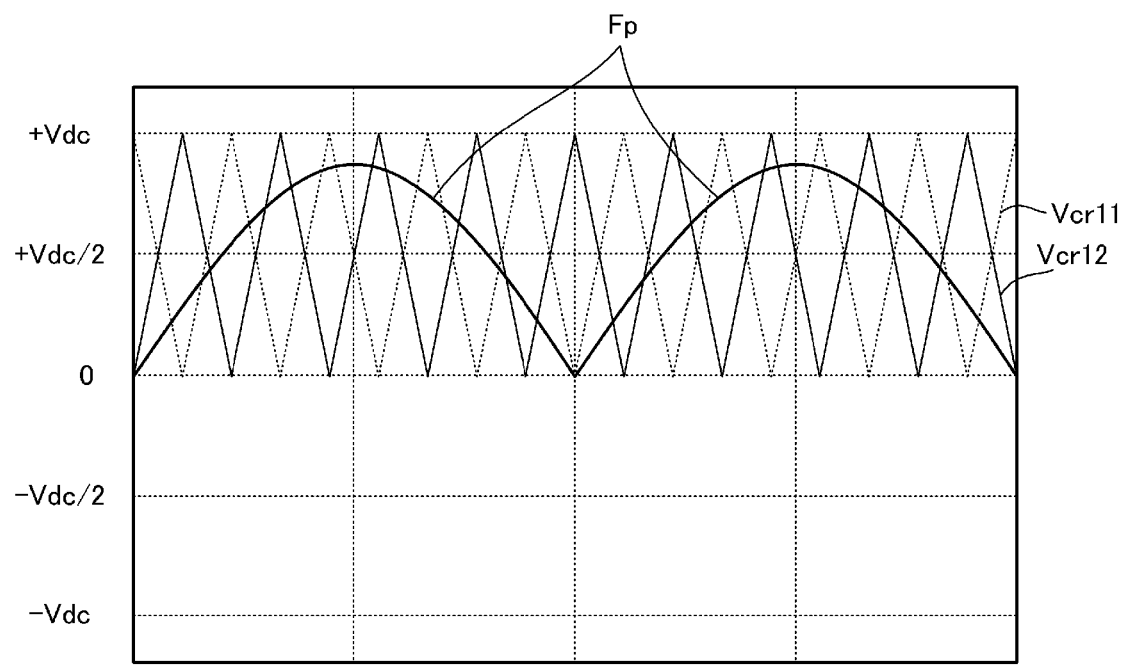
FIG. 10 are waveform diagrams of a PWM modulation voltage Vu_pwm and the target value Vu* when PWM-control is performed for the output voltage Vu.
Figure 10:
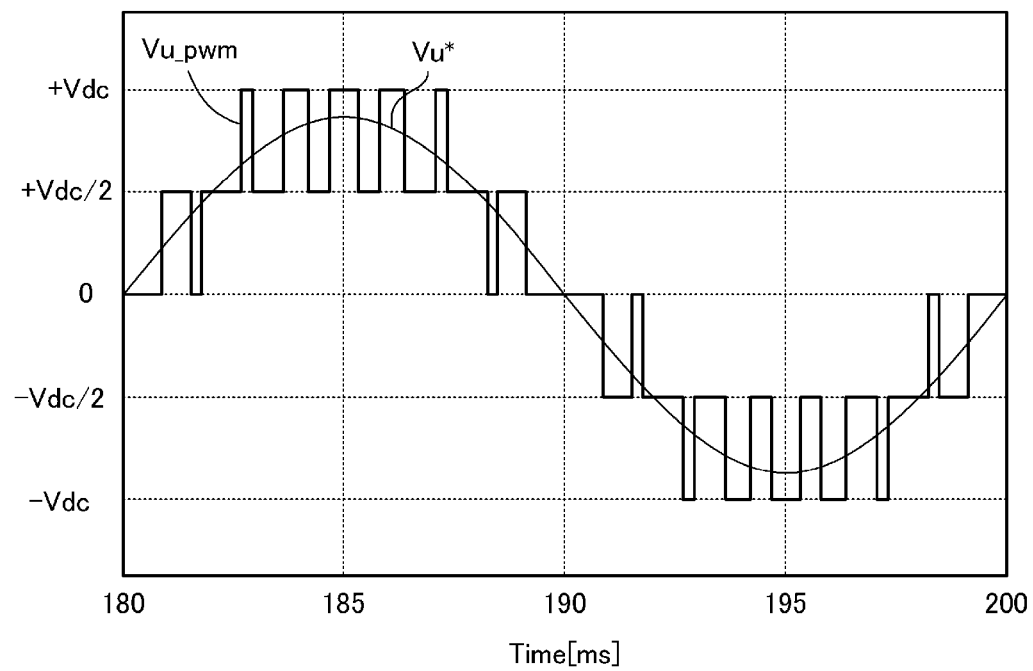

FIG. 10 are waveform diagrams of a PWM modulation voltage Vu_pwm and the target value Vu* when PWM control is performed for the output voltage Vu. It should be noted that triangular waves Vcr11 and Vcr12 are reference voltage waveforms for PWM modulation when the output voltage is 0 to Vdc. A signal Fp is an absolute value signal of the target value Vu*.

In this manner, when the target voltage Vu* is in the range of 0 to Vdc/2, PWM modulation is performed using two values of 0 and Vdc/2. When the target voltage Vu* is in the range of Vdc/2 to Vdc, PWM modulation is performed using two values of Vdc/2 and Vdc. In the same manner, when the target voltage Vu* is in the range of 0 to −Vdc/2, PWM modulation is performed using two values of 0 and −Vdc/2, and when the target voltage Vu* is in the range of −Vdc/2 to −Vdc, PWM modulation is performed using two values of −Vdc/2 and −Vdc.

Thus, the sine wave voltage is generated by the PWM modulation using a plurality of voltage levels, so that a ripple current flowing through the inductors L1 and L2 is small and loss by the inductors L1 and L2 is reduced. This enables the small-sized inductors L1 and L2 to be used.

Figure 11:
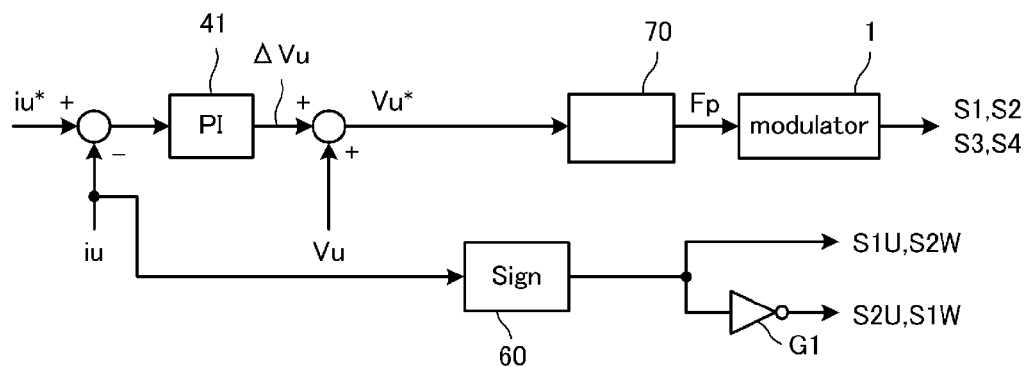
FIG. 11 is a block diagram of a driving controller that generates gate signals for the four front-stage switches and the four rear-stage switch elements.

FIG. 11 is a block diagram of a driving controller 201 that generates gate signals for the four front-stage switches S1 to S4 and the four rear-stage switches S1U, S2U, S1W, and S2W when it is used for system interconnection. In FIG. 11, respective signals indicate as follows.

iu*: Target value of output current
iu: Detected value of output current
Vu*: Voltage target value
Vu: Voltage detected value
ΔVu: Voltage correction value The driving controller 201 and the inverter device 101 as illustrated in FIG. 1 configure a power system interconnection inverter device.

In FIG. 11, a proportional integral (PI) controller 41 calculates a voltage correction value ΔVu toward reducing a current error (iu*−iu) of the output by PI operation based on the current error (iu*−iu).

The voltage detected value Vu of the system is corrected by adding the voltage correction value ΔVu so as to obtain the voltage target value Vu*.

A converter 60 detects zero cross of the detected value iu of the output current so as to apply gate signals to the rear-stage switches S1U and S2W. The converter 60 outputs a high-level signal when the current value iu is positive. A NOT circuit G1 inverts the output signal of the sign conversion unit 60 and applies gate signals to the rear-stage switches S2U and S1W.

An inverter 70 performs sign inversion of the voltage target value Vu* and applies a half-cycle signal (signal with a waveform like a positive full-wave rectification waveform) Fp of the voltage target value Vu* to a modulator 1.

Figure 12:
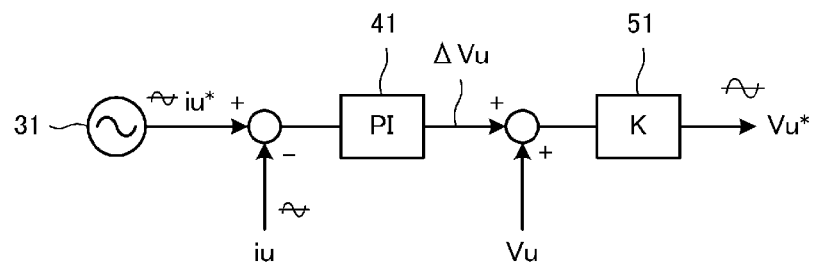
FIG. 12 is a diagram illustrating the detailed configuration of a generation circuit of the voltage target value Vu* of the driving controller.

FIG. 12 is a diagram illustrating the detail configuration of a generator of the voltage target value Vu* of the driving controller 201 as illustrated in FIG. 11.

A sine wave generator 31 generates a signal (sine wave) of the target value iu* of the output current. The sine wave is a signal that is in-phase (synchronized) with a voltage phase of the system. The PI controller 41 calculates the voltage correction value ΔVu toward reducing the current error (iu*−iu) by the PI operation based on the current error (iu*−iu) as described above. A generator 51 multiplies (Vu+ΔVu) by a predetermined coefficient so as to generate the voltage target value Vu*. The coefficient is defined in accordance with a feedback gain.

Figure 13:
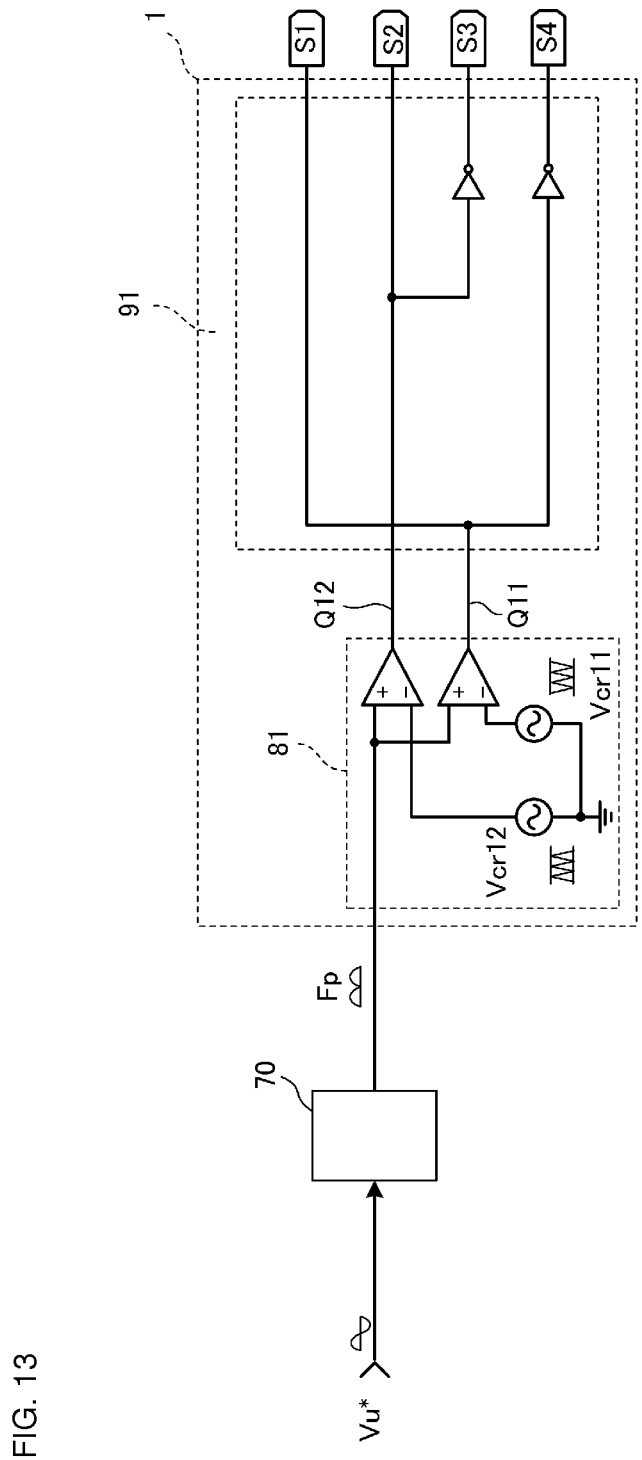
FIG. 13 is a detailed circuit diagram illustrating a circuit configured to generate the gate signals for the four front-stage switches based on the voltage target value Vu*.

FIG. 13 is a detailed diagram illustrating a signal generator configured to generate the gate signals for the four front-stage switches S1 to S4 and the four rear-stage switches S1U, S2U, S1W, and S2W based on the voltage target value Vu*.

The inverter 70 performs the sign inversion of the voltage target value Vu*, converts the voltage target value Vu* into the positive half-cycle signal Fp, and applies it to the modulator 1.

The modulator 1 preferably is configured by a PWM modulator 81 and a switch driver 91. The PWM modulator 81 applies a signal obtained by modulating the cycle signal of the target value Vu* with triangular waves to the switch driving unit 91. The PWM modulator 81 preferably includes two generators that generate triangular waves Vcr11 and Vcr12 and two comparators.

Figures 14, 15:
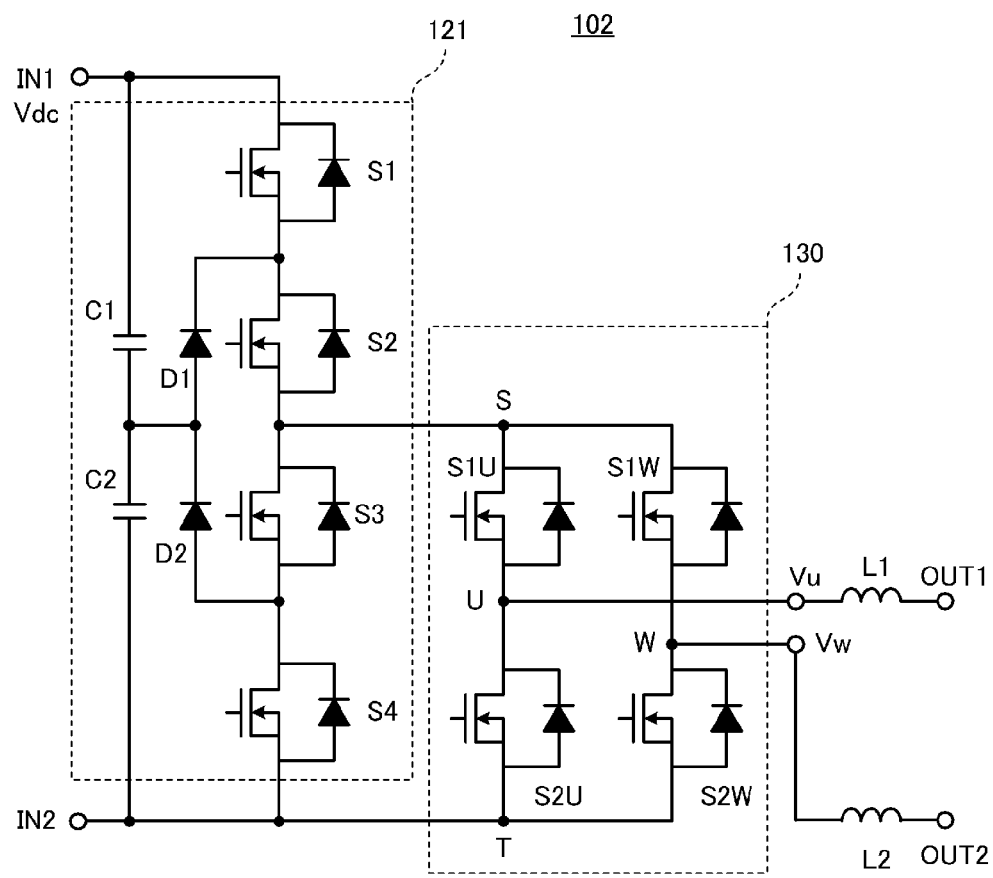
FIG. 14 is a table illustrating states of the switches depending on an output signal of a PWM modulator and an output signal of a switch driving unit.
FIG. 15 is a circuit diagram of an inverter device according to a second preferred embodiment of the present invention.

FIG. 14 is a table illustrating states of the switches S1 to S4 depending on output signals Q11 and Q12 of the PWM modulator 81 and an output signal of the switch driving unit 91.

With the above-mentioned configuration, a sine wave current is flowed into the power system from the inverter device 101. The voltage target value Vu* is corrected such that the detected value iu of the output current is equal or substantially equal to the target value iu*. With this, feedback control is performed and the current of the target value is flowed into the system.

Second Preferred Embodiment

FIG. 15 is a circuit diagram of an inverter device according to a second preferred embodiment of the present invention.

In an inverter device 102 in the second preferred embodiment, a three-level inverter circuit 121 is connected between the first input terminal IN1 and the second input terminal IN2. The three-level inverter circuit 121 includes the first front-stage switch S1, the second front-stage switch S2, the third front-stage switch S3, and the fourth front-stage switch S4 that are connected in series between the first input terminal IN1 and the second input terminal IN2.

Diodes D1 and D2 are connected in series between a connection point of the first front-stage switch S1 and the second front-stage switch S2 and a connection point of the third front-stage switch S3 and the fourth front-stage switch S4. Capacitors C1 and C2 are connected in series between the first input terminal IN1 and the second input terminal IN2. The capacitors C1 and C2 preferably have the same or substantially the same capacity. A connection point of the diodes D1 and D2 is connected to a connection point of the capacitors C1 and C2. The diodes D1 and D2 and the capacitors C1 and C2 correspond to an intermediate voltage output circuit according to a preferred embodiment of the present invention.

Other configurations of the bridge circuit 130, the inductors L1 and L2, and the like preferably are the same as those in the first preferred embodiment and description thereof is omitted.

Figure 17:
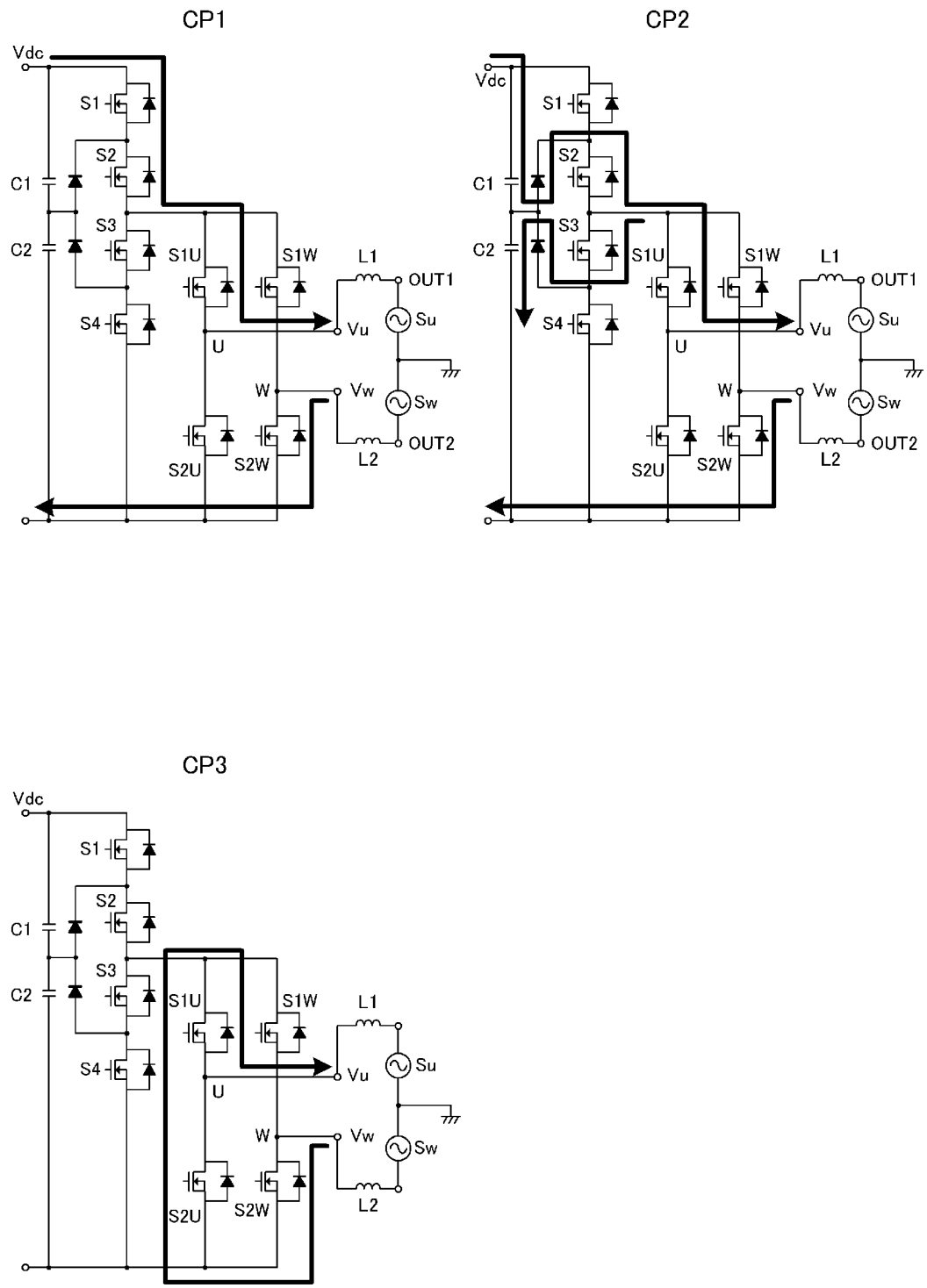
FIG. 17 are diagrams illustrating current paths in states CP1 to CP3 as illustrated in FIG. 16.
Figure 18:
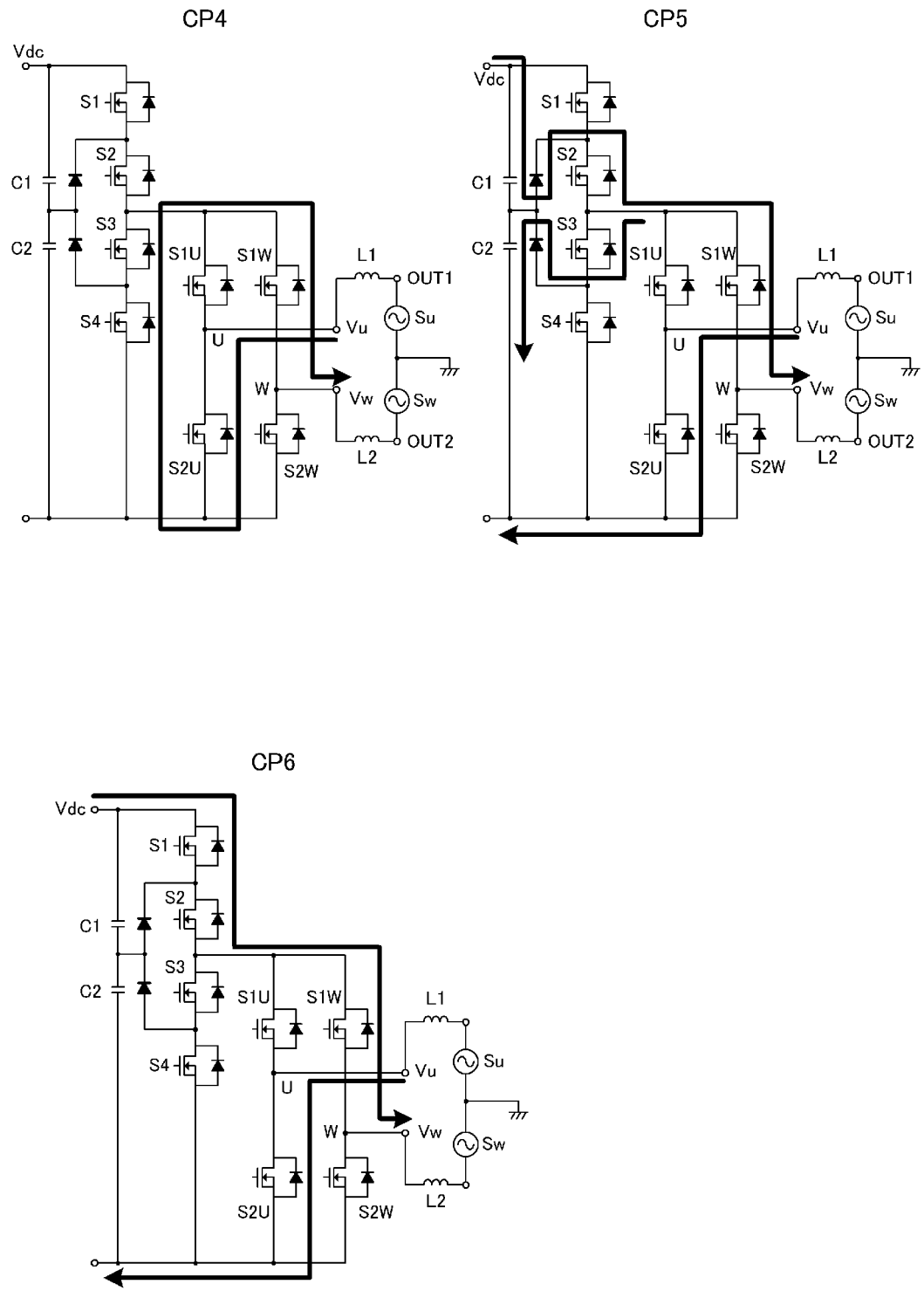
FIG. 18 are diagrams illustrating current paths in states CP4 to CP6 as illustrated in FIG. 16.

FIG. 16 is a table illustrating relationships among states of the four front-stage switches S1 to S4, states of the four rear-stage switches S1U, S2U, S1W, and S2W, and an instantaneous value (instantaneous voltage difference between the terminals U and W) of the output voltage Vu of the terminals U–W. FIG. 17 are diagrams illustrating current paths in states CP1 to CP3 as illustrated in FIG. 16. FIG. 18 are diagrams illustrating current paths in states CP4 to CP6 as illustrated in FIG. 16.

As described in the first preferred embodiment, when the target value Vu* of the output voltage Vu is in a range of 0 to Vdc/2, state shift between the state CP3 and the state CP2 among the three states as illustrated in FIG. 17 is repeated by the PWM control. When the target value Vu* of the output voltage Vu is in a range of Vdc/2 to Vdc, state shift between the state CP1 and the state CP2 among the three states as illustrated in FIG. 17 is repeated as a result by the PWM control.

The capacitors C1 and C2 have large capacities. Therefore, when an electric current flows through the capacitors C1 and C2, the output voltage Vo is Vdc/2.

When the target value Vu* of the output voltage Vu is in a range of 0 to –Vdc/2, state shift between the state CP4 and the state CP5 among the three states as illustrated in FIG. 18 is repeated by the PWM control. When the target value Vu* of the output voltage Vu is in a range of –Vdc/2 to –Vdc, state shift between the state CP5 and the state CP6 among the three states as illustrated in FIG. 18 is repeated by the PWM control.

It should be noted that in the states CP2 and CP5, the front-stage switch S3 is also ON, so that electric current flows through any of two ways to/from the system.

Thus, the inverter device 102 in the second preferred embodiment configures a five-level circuit by the configuration of the three-level inverter circuit 121 and the bridge circuit 130 as in the first preferred embodiment. In the inverter device 102, the four rear-stage switches S1U, S2U, S1W, and S2W are switching-controlled not at the carrier frequency but at the power supply frequency of the system, thus reducing the switching loss. Further, the five-level output is realized by the configuration of the three-level inverter circuit 121 and the bridge circuit 130. This reduces the number of switch elements, the size, and the cost.

Third Preferred Embodiment

In the first preferred embodiment and the second preferred embodiment, the first inductor L1 preferably is provided between the bridge circuit 130 and the first output terminal OUT1 and the second inductor L2 is provided between the bridge circuit 130 and the second output terminal OUT2. Alternatively, the first inductor L1 and the second inductor L2 may be provided between the three-level inverter circuit 120 and the bridge circuit 130.

Figure 19:
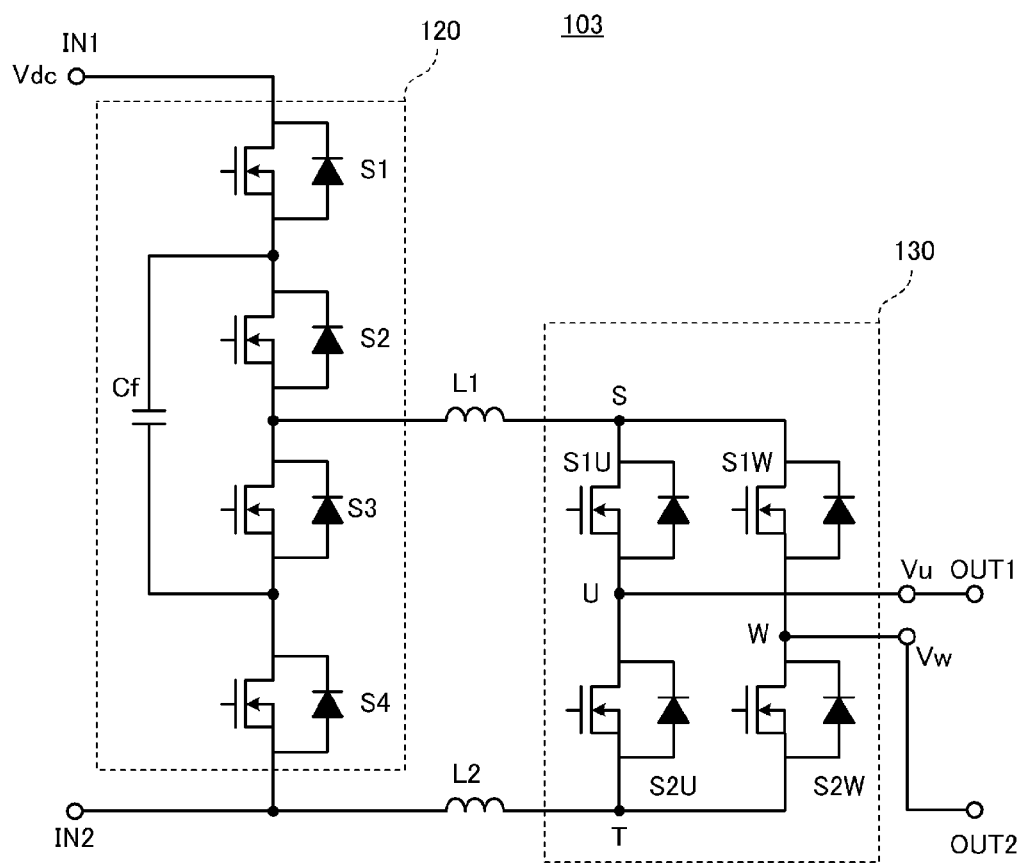
FIG. 19 is a circuit diagram of an inverter device according to a third preferred embodiment of the present invention.

FIG. 19 is a circuit diagram of an inverter device according to the third preferred embodiment. In an inverter device 103 in the third preferred embodiment, one terminal of the first inductor L1 is connected to a connection point of the second front-stage switch S2 and the third front-stage switch S3 of the three-level inverter circuit 120. The other terminal of the first inductor L1 is connected to a first terminal S of the bridge circuit 130. Further, one terminal of the second inductor L2 is connected to a connection point of the fourth front-stage switch S4 of the three-level inverter circuit 120 and the second input terminal IN2. The other terminal of the second inductor L2 is connected to the second terminal T of the bridge circuit 130. Other configurations are preferably the same as those in the first preferred embodiment and description thereof is omitted.

Also in the present preferred embodiment, the smoothing action by the inductors is preferably same as that in the first preferred embodiment and the second preferred embodiment. Note that any one of the first inductor L1 and the second inductor L2 may be omitted as long as an effect of the smoothing action is in an allowable range.

The inductor is installed at the front stage of the bridge circuit 130, so that drain-source voltages of the front-stage switches of the bridge circuit 130 are more stable. Therefore, an influence of voltage fluctuation by a switching operation is significantly reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An inverter device that receives input of a direct-current voltage through a first input terminal and a second input terminal and outputs an alternating-current voltage through a first output terminal and a second output terminal, the inverter device comprising:
    a three-level inverter circuit including:
        first, second, third, and fourth front-stage switches which are connected in series between the first input terminal and the second input terminal; and
        an intermediate voltage output circuit in which a first terminal is connected to a connection point of the first front-stage switch and the second front-stage switch and a second terminal is connected to a connection point of the third front-stage switch and the fourth front-stage switch, and which outputs an intermediate voltage of the direct-current voltage through a connection point of the second front-stage switch and the third front-stage switch;
    a bridge circuit including first, second, third, and fourth rear-stage switches which are bridge-connected to first, second, third, and fourth terminals, the first terminal of the bridge circuit being connected to a connection point of the second front-stage switch and the third front-stage switch, the second terminal of the bridge circuit being connected to the second input terminal, the third terminal of the bridge circuit being connected to the first output terminal, and the fourth terminal of the bridge circuit being connected to the second output terminal; and
    at least one inductor configured to perform a smoothing action.

2. The inverter device according to claim 1, wherein
    the first rear-stage switch and the fourth rear-stage switch is turned ON or OFF at the same time;
    the second rear-stage switch and the third rear-stage switch is turned ON or OFF at the same time; and
    a switching frequency of the first, second, third, and fourth rear-stage switches is a frequency of an alternating-current power supply voltage that is generated between the first output terminal and the second output terminal; and
    a switching frequency of the first, second, third, and fourth front-stage switches is higher than the switching frequency of the first, second, third, and fourth rear-stage switches and is a frequency at which the smoothing action by the at least one inductor is generated.

3. The inverter device according to claim 1, further comprising:
- a detector configured or programmed to detect an output current and an output voltage from the first output terminal and the second output terminal of the intermediate voltage output circuit;
- an amplifier configured or programmed to amplify a current error as an error of the output current with respect to a sine wave current target value;
- a calculator configured or programmed to calculate a voltage correction value to reduce the current error;
- a controller configured or programmed to superimpose the voltage correction value on a detected value of the output voltage so as to calculate a voltage target value;
- a PWM modulator configured or programmed to calculate a PWM modulation signal of the voltage target value;
- a switch driver configured or programmed to drive the first, second, third, and fourth front-stage switches based on the PWM modulation signal; and
- a switch configured or programmed to change a state of the bridge circuit based on a sign of a current detected value.

4. The inverter device according to claim 1, wherein the intermediate voltage output circuit includes a floating capacitor including a first terminal connected to a connection point of the first front-stage switch and the second front-stage switch and a second terminal connected to a connection point of the third front-stage switch and the fourth front-stage switch.

5. The inverter device according to claim 1, wherein the intermediate voltage output circuit includes:
- a first capacitor and a second capacitor which are connected in series between the first input terminal and the second input terminal;
- a first diode including a cathode connected to a connection point of the first front-stage switch and the second front-stage switch and an anode connected to a connection point of the first capacitor and the second capacitor; and
- a second diode including a cathode connected to a connection point of the first capacitor and the second capacitor and an anode connected to a connection point of the third front-stage switch and the fourth front-stage switch.

6. The inverter device according to claim 1, wherein the at least one inductor is provided at least one of between a connection point of the second front-stage switch and the third front-stage switch and the first terminal, and between a connection point of the fourth front-stage switch and the second input terminal and the second terminal.

7. The inverter device according to claim 1, wherein the first, second, third, and fourth front-stage switches are metal-oxide-semiconductor field-effect transistors.

8. The inverter device according to claim 1, wherein the first, second, third, and fourth rear-stage switches are metal-oxide-semiconductor field-effect transistors.

9. The inverter device according to claim 3, wherein the PWM modulator includes two triangular wave generators and two comparators.

10. The inverter device according to claim 1, wherein the at least one inductor includes a first inductor provided between the bridge circuit and the first output terminal, and a second inductor provided between the bridge circuit and the second output terminal.

11. The inverter device according to claim 1, wherein the at least one inductor includes a first inductor and a second inductor provided between the three-level inverter circuit and the bridge circuit.

* * * * *